Aug. 26, 1947.    M. J. GOULD    2,426,199
BRUSHLESS TYPE OF MOTOR OR GENERATOR
Filed Oct. 27, 1944

Inventor
Martin J. Gould
By W. Glenn Jones
Attorney

Patented Aug. 26, 1947

2,426,199

UNITED STATES PATENT OFFICE 2,426,199

BRUSHLESS TYPE OF MOTOR OR GENERATOR

Martin James Gould, Washington, D. C.

Application October 27, 1944, Serial No. 560,584

1 Claim. (Cl. 171—252)

(Granted under the act of March 3, 1883, as amended April 30, 1928; 370 O. G. 757)

This invention relates to alternators or motors, particularly to the brushless type.

This invention discloses a new type of alternator which dispenses with collector rings and brushes, thereby eliminating all the attendant objections such as brush noise, brush wearing, and brush adjustments.

The principal object of this invention is to provide capacitive coupling means that will transmit current from the armature of an alternator to an outside circuit without the use of collector rings or brushes.

The details of my invention will now be described with respect to the accompanying drawings in which.

Figure 1:
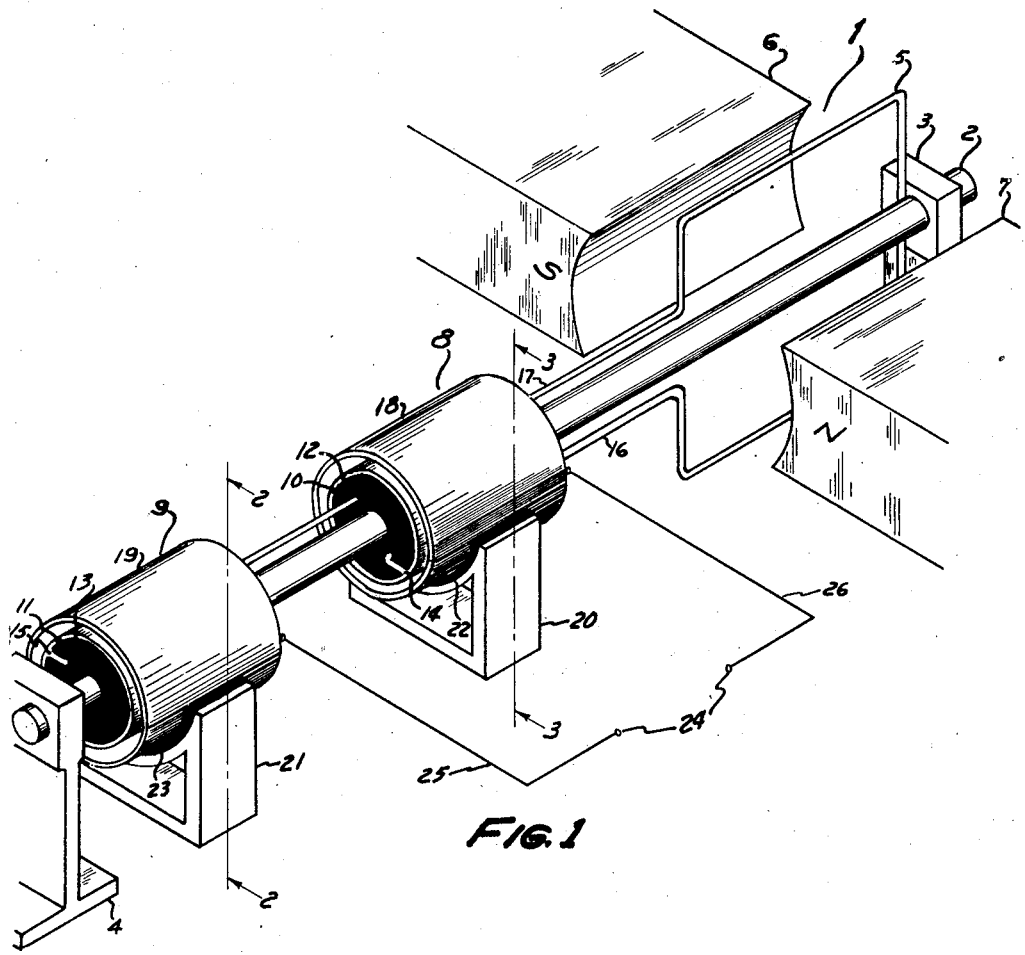
Fig. 1 is an isometric view of the assembled apparatus showing the generator, schematically, and the connected capacitors, realistically.
Figures 2, 3:
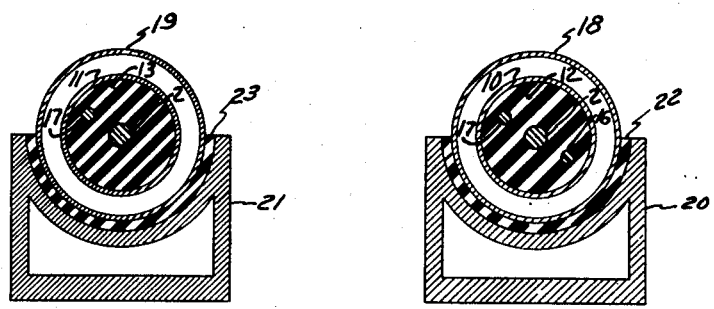
Fig. 2 is a sectional view taken along line 2—2 of Fig. 1.
Fig. 3 is a sectional view taken along line 3—3 of Fig. 1.

Referring to the drawings by numerals, 1 represents, generally, an elementary alternating electric generator comprising driven armature shaft 2 suitably journalled in bearings and supported at its ends in the usual bearing pillow blocks 3 and 4. Mounted on said shaft is an armature winding element 5 operatively associated with magnetic pole pieces 6 and 7. For purposes of this description a bipolar alternator is disclosed. However, this invention is not limited to bipolar machines, but may be applied to multipolar machines as well. It is understood that shaft 2 can be made of insulating material thereby dispensing with the rubber elements 12 and 13 as insulating means.

Cylindrical capacitors 8 and 9 are associated with the generator armature to transmit current from the armature to an outside circuit as hereinafter described. Mounted rotatively rigid on armature shaft 2, and coaxially therewith, are inner cylindrical capacitor elements 10 and 11. The mounting is accomplished by rubber 12 and 13 or other insulation means being interposed between the shaft 2 and said cylindrical elements 10 and 11, and utilizing the bonding characteristics of the materials to unite the shaft, rubber and inner cylindrical element into a rotatively rigid unit. It is understood that any of the various affixation means, other than bonding, can be used to unite said elements together, such as by screws, pins, keys, rivets, etc.

One end 16 of armature winding 5 is electrically connected to cylindrical capacitor element 10, as at 14; the other end 17 to cylindrical capacitor element 11, as at 15.

Outer cylindrical capacitor elements 18 and 19, are coaxially positioned around inner cylindrical capacitor elements 10 and 11, and mounted stationarily in saddle blocks 20 and 21, respectively. The outer cylindrical capacitor elements 18 and 19 are insulated from said saddle blocks 20 and 21 by means of rubber 22 and 23, respectively, or by any other type of insulation. The bonding characteristics of rubber or other insulation can be used to unite the outer cylindrical capacitor elements to the saddle blocks to assure stationary positionment of the outer cylindrical capacitor elements. However, the saddle blocks 20 and 21 may be of an insulating material thereby dispensing with the rubber insulators 22 and 23. It is understood that many other means of securement would serve just as well, such as by screws, pins, keys, rivets, etc.

The outer cylindrical elements 18 and 19 are electrically connected to output terminals 24, by means of leads 25 and 26.

*Operation.*—Assuming a suitable electrical load across terminals 24, as armature winding 5 is rotated between magnetic pole pieces 6 and 7 an alternating electro-motive-force is generated in the armature winding. The capacitors 8 and 9, being connected in series with said energized winding 5, become electrically charged in accordance with the voltage induced in armature winding 5, and an alternating current will flow in the circuit through said capacitors. It is understood that a dielectric may be interposed between the cylindrical capacitor elements to increase the capacitor's effectiveness. The drawings show the ends 16 and 17 of armature winding 5 as being parallel to and displaced from shaft 2. However, it is understood that said ends may lie in grooves cut in the shaft or in an axial bore through the shaft, thereby allowing additional bearing supports between the capacitors, and between capacitor 13 and the pole pieces.

The invention described herein may be manufactured and used by or for the Government of the United States of America for governmental purposes without the payment of any royalties thereon or therefor.

What is claimed is:

The combination, with an alternator, its armature winding means and armature shaft, of a pair of spaced insulating supports, a cylindrical capacitor whose inner cylindrical element is coaxially mounted rotatively rigid on said armature shaft and insulated therefrom, and whose outer cylindrical element is fixedly mounted on its support, a second cylindrical capacitor whose inner cylindrical element is coaxially mounted rotatively rigid on said armature shaft and insulated therefrom, and whose outer cylindrical element is also fixedly mounted on its support, said inner cylindrical element of each capacitor being connected in series circuit with said armature winding means, and output terminals connected to each outer cylindrical element.

MARTIN JAMES GOULD.

REFERENCES CITED

The following references are of record in the file of this patent:

UNITED STATES PATENTS

| Number | Name | Date |
|---|---|---|
| 429,736 | Pfund | June 10, 1890 |
| 2,059,271 | Parker | Nov. 3, 1936 |